(12) United States Patent
Morishita et al.

(10) Patent No.: US 10,307,964 B2
(45) Date of Patent: Jun. 4, 2019

(54) THREE-DIMENSIONAL MOLDING METHOD

(71) Applicants: Fukui Prefectural Government, Fukui, Fukui (JP); Matsuura Machinery Corporation, Fukui, Fukui (JP)

(72) Inventors: Kazuyuki Morishita, Fukui (JP); Yuya Matsuda, Fukui (JP); Tetsushi Midorikawa, Fukui (JP)

(73) Assignees: Fukui Prefectural Government, Fukui, Fukui (JP); Matsuura Machinery Corporation, Fukui, Fukui (JP)

( * ) Notice: Subject to any disclaimer, the term of this patent is extended or adjusted under 35 U.S.C. 154(b) by 0 days.

(21) Appl. No.: 16/045,028

(22) Filed: Jul. 25, 2018

(65) Prior Publication Data

US 2019/0030825 A1 Jan. 31, 2019

(30) Foreign Application Priority Data

Jul. 31, 2017 (JP) .................................. 2017-148397

(51) Int. Cl.
  B29C 41/02 (2006.01)
  B29C 64/40 (2017.01)
  B29C 33/44 (2006.01)
  B33Y 10/00 (2015.01)
  B29C 64/153 (2017.01)
  B22F 3/105 (2006.01)
  B29K 105/00 (2006.01)

(52) U.S. Cl.
  CPC ............ B29C 64/40 (2017.08); B22F 3/1055 (2013.01); B29C 33/448 (2013.01); B29C 64/153 (2017.08); B33Y 10/00 (2014.12); B22F 2003/1058 (2013.01); B29K 2105/251 (2013.01)

(58) Field of Classification Search
  CPC ........... B22F 3/1055; B22F 2003/1058; B29C 33/448; B29C 64/153; B29C 64/40
  USPC ................. 264/317, 497; 219/121.66, 121.85
  See application file for complete search history.

(56) References Cited

U.S. PATENT DOCUMENTS

| 5,595,703 A * | 1/1997 | Swaelens ................ B29C 64/40 |
|  |  | 264/401 |
| 2014/0303942 A1* | 10/2014 | Wighton ............... B29C 64/153 |
|  |  | 703/1 |

(Continued)

FOREIGN PATENT DOCUMENTS

| JP | 9-85837 A | 3/1997 |
| JP | 2004-358968 A | 12/2004 |
| JP | 2015-529579 A | 10/2015 |

(Continued)

*Primary Examiner* — Leo B Tentoni
(74) *Attorney, Agent, or Firm* — Richard M. Goldberg

(57) ABSTRACT

A three-dimensional molding method in which a step of sintering a powder layer with a laser light or an electron beam after a flat surface has been formed by sliding of a squeegee against the powder layer is repeated in a prescribed number of times, and then the periphery is cut, in order to mold both the object 1 to be molded and a support structure 2 that supports the lower side of the object 1 from below and is intended to be removed after molding, wherein in the support structure 2, the upper parts of the struts connected to the object 1 to be molded employ truncated circular conic shapes or partial truncated circular conic shapes that are reduced in diameter toward the top.

11 Claims, 7 Drawing Sheets

(56) References Cited

U.S. PATENT DOCUMENTS

| | | | |
|---|---|---|---|
| 2015/0258609 A1* | 9/2015 | Teulet | B22F 3/1055 |
| | | | 264/497 X |
| 2018/0162059 A1* | 6/2018 | Hofmann | B29C 64/40 |

FOREIGN PATENT DOCUMENTS

| | | |
|---|---|---|
| JP | 2016-533571 A | 10/2016 |
| WO | 2014/174090 A2 | 10/2014 |

* cited by examiner

[Fig. 1]
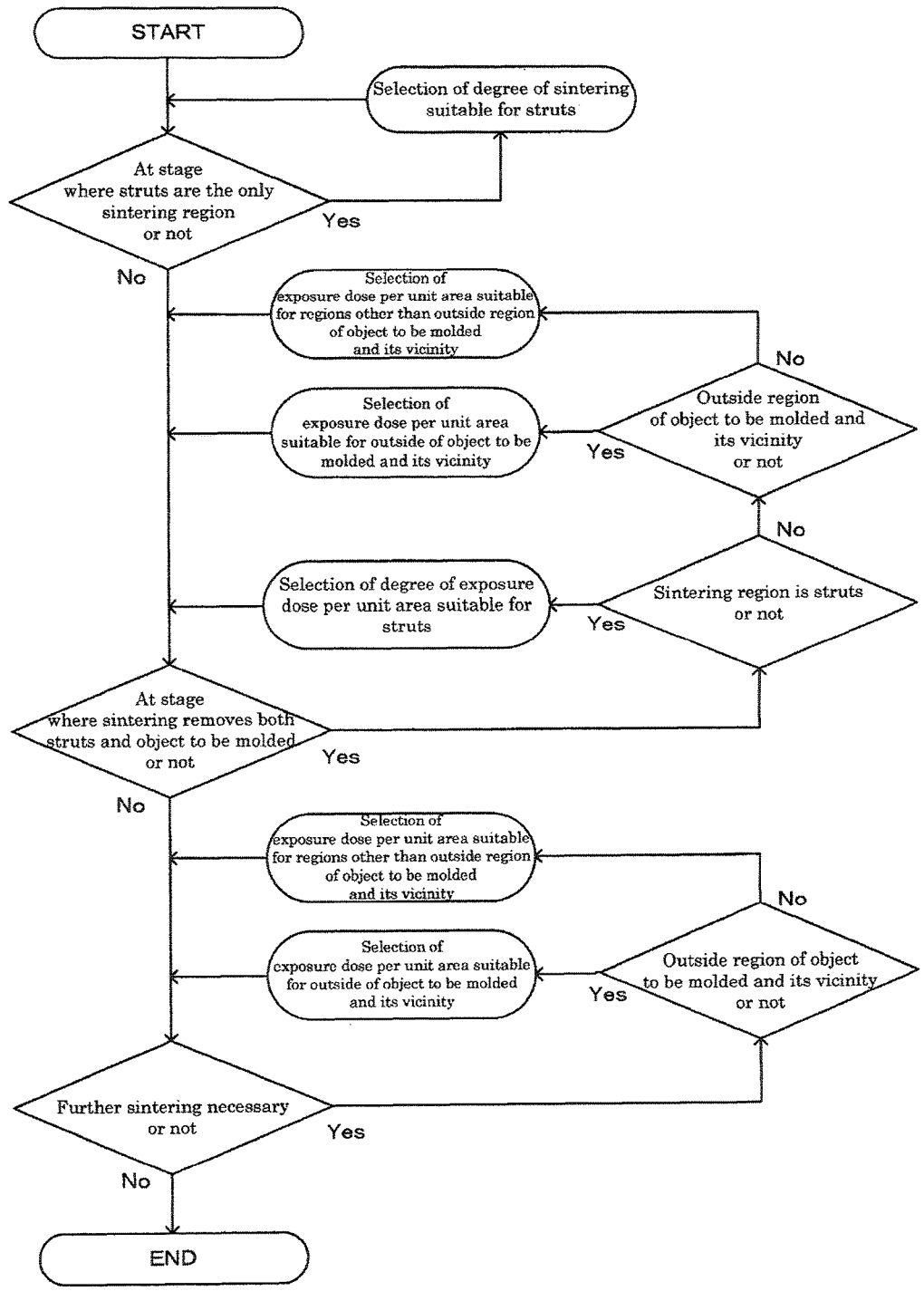

[Fig. 2]
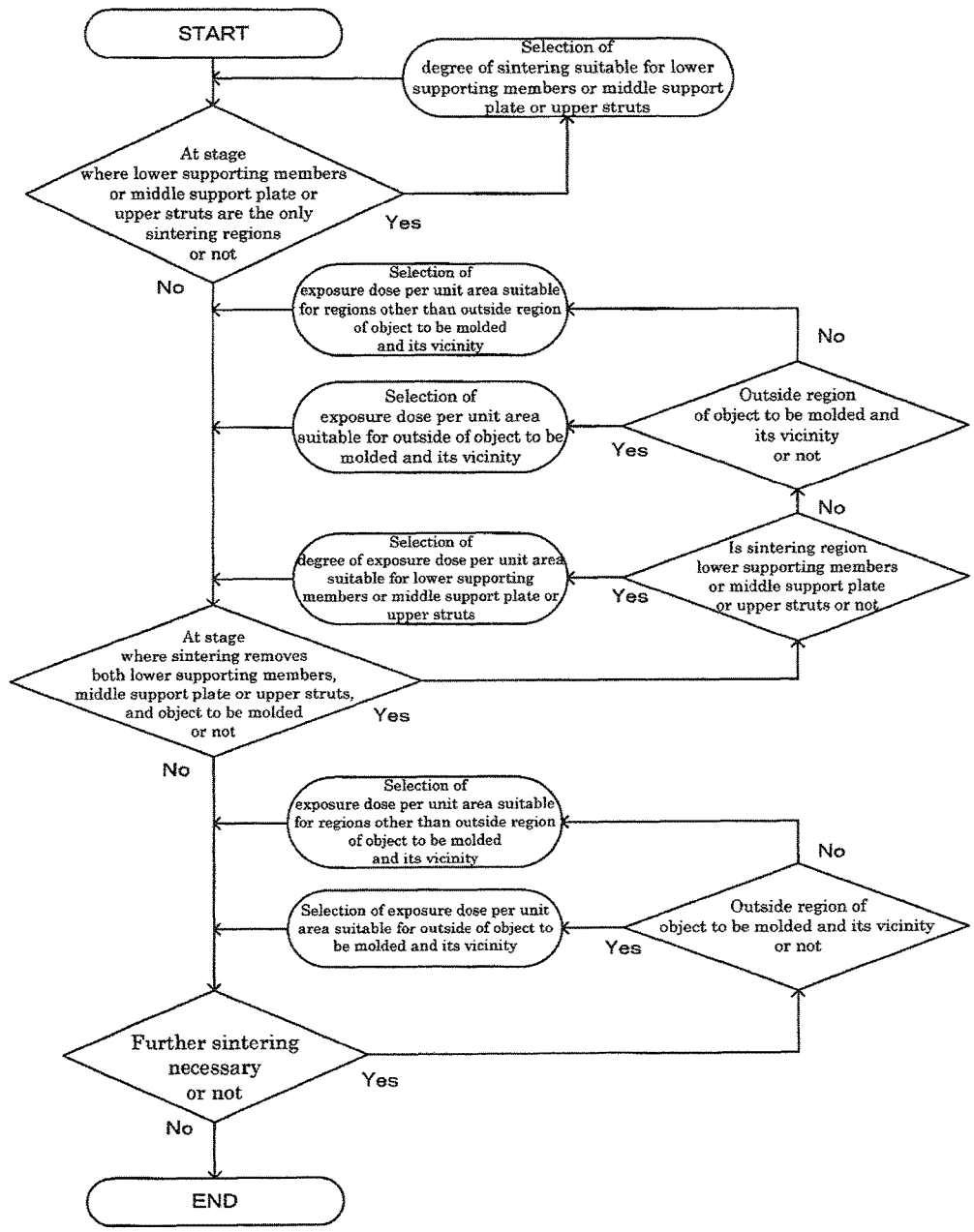

[Fig. 3]
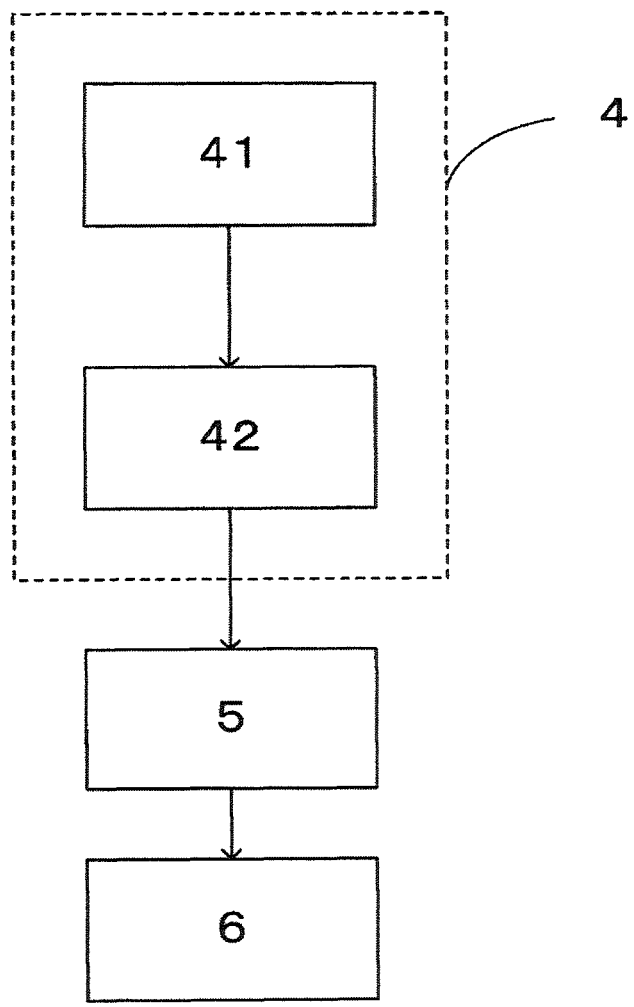

THREE-DIMENSIONAL MOLDING METHOD

TECHNICAL FIELD

The present invention relates to a three-dimensional molding method used to mold an object to be molded and a support structure that is to support the object from below.

BACKGROUND ART

In three-dimensional molding methods wherein a powder layer flattened by movement of a squeegee is sintered by a laser light or an electron beam and the periphery is cut, it is already common to employ a method of molding an object to be molded after the support structure below the object has been molded, instead of molding the object from the location of a base plate in a molding chamber, as disclosed in Patent Document 1, for example.

The main reason for first molding a support structure from below the section to be molded is that:

a) when a support structure is not provided below, a complex operation is necessary for removal from the base plate after molding, since the lower side of the object to be molded is adhered to the base plate, and b) the region of the lower side of the object to be molded that is not in contact with the base plate moves downward by its own weight while pressing the powder layer below it, and this sometimes interferes with formation of a proper lower side.

The support structure may also employ a construction which is one of:

(1) struts lying between the object to be molded and the base plate, or (2) upper struts, a middle partition plate or a lower supporting member, lying between the object to be molded and the base plate.

Patent Document 1 actually employs a construction similar to (1) above (FIG. 5, claims 1 and 20) and the construction of (2) above (FIG. 8 and claim 21).

It is naturally intended for the support structure to be removed from the object to be molded and the base plate at the stage where molding of the object to be molded has been completed.

In the middle stage and final stage of molding of a support structure, when the squeegee moves while sliding on the powder layer, the squeegee contacts with protruding regions at corners (nooks) with prescribed angles that have formed on the sintered struts of (1) or the upper struts of (2), and those regions interfere with movement of the squeegee and thus often cause accidents in which sliding of the squeegee against the powder layer is hindered.

However, in conventional three-dimensional molding using support structures, no modifications have been made to maximally facilitate removal of the support structure or to minimize accidents caused by contact described above.

In fact, this technical problem is not at all considered even in Patent Document 1.

PRIOR ART DOCUMENT

Patent Document

[Patent Document 1] WO2014/174090

SUMMARY OF INVENTION

Problem to be Solved

It is an object of the present invention to provide, in a three-dimensional molding method for molding of an object to be molded and a support structure that is to support the object from below, a construction such that the support structure is efficiently removed from the object to be molded and base plate after molding, and virtually no hindrance to movement of the squeegee is produced.

Means for Solving the Problem

In order to solve the aforementioned problems, the present invention stands on the following basic construction.

(1) A three-dimensional molding method in which a step of sintering a powder layer with a laser light or an electron beam after a flat surface has been formed by sliding of a squeegee against the powder layer is repeated in a prescribed number of times, and then the periphery is cut, to mold both an object to be molded and a plurality of struts that support the lower side of the object from below and are intended to be removed after molding, wherein the upper parts of the struts employ truncated circular conic shapes or partial truncated circular conic shapes that are reduced in diameter toward the top.

(2) A three-dimensional molding method in which a step of sintering a powder layer with a laser light or an electron beam after a flat surface has been formed by sliding of a squeegee against the powder layer is carried out multiple times, and then the periphery is cut, in order to mold an object to be molded, a plurality of struts that support the object to be molded from the lower side and are intended to be removed after molding, a middle partition plate that supports the struts from below and is intended to be removed after molding, and lower supporting members that support the partition plate from below and are intended to be removed after molding, wherein the upper parts of the upper struts employ truncated circular conic shapes or partial truncated circular conic shapes that are reduced in diameter toward the top.

Advantageous Effects of Invention

The basic construction (1) is characterized in that the upper part of the struts forming the support structure have truncated circular conic shapes or partial truncated circular conic shapes, while the basic construction (2) is characterized in that the upper regions of the upper struts, the middle partition plate and the upper struts of the lower supporting members forming the support structure, have truncated circular conic shapes or partial truncated circular conic shapes.

In regard to the shapes, when the connection surfaces between the struts and upper struts with the lower side of the object to be molded are horizontal flat surfaces, truncated circular conic shapes may be employed for the upper parts of the struts and upper struts.

In contrast, when the connection surfaces are curved, or when they are formed in oblique directions with respect to the horizontal direction, it is impossible to obtain pure truncated circular conic shapes as the shapes of the upper parts of the struts or upper struts, and therefore partial truncated circular conic shapes must be employed.

Consequently, for the basic constructions (1) and (2), it is a necessary condition to employ "truncated circular conic shapes or partial truncated circular conic shapes."

Thus, in the case that truncated circular conic shapes or partial truncated circular conic shapes are employed for the upper parts of the struts and upper struts, following actions with effect may be achieved:

(a) During removal of the support structure from the object to be molded, the removal can be efficiently accomplished since the area of the connected sections is smaller than when other shapes are used.

(b) When the support structure is to be removed from the object to be molded by striking with a hammer, the striking direction may be selected as desired.

(c) With truncated circular conic shapes or partial truncated circular conic shapes, the contact surfaces will be circular or elliptical (when the contact surfaces have flat shapes) or slightly deformed circular or elliptical (when the contact surfaces are curved surfaces), and as a result, corner regions with prescribed angles will not be formed, such that even when they contact with the squeegee when it is moving, they will produce virtually no hindrance to the movement, thus contributing to smooth movement of the squeegee.

BRIEF DESCRIPTION OF DRAWINGS

FIG. 1 is a flowchart corresponding to the construction of Example 1.

FIG. 2 is a flowchart corresponding to the construction of Example 2.

FIG. 3 is a block diagram for a CAD/CAM system used to carry out the flowcharts of Examples 1 and 2.

DESCRIPTION OF EMBODIMENTS

Figure 4A:
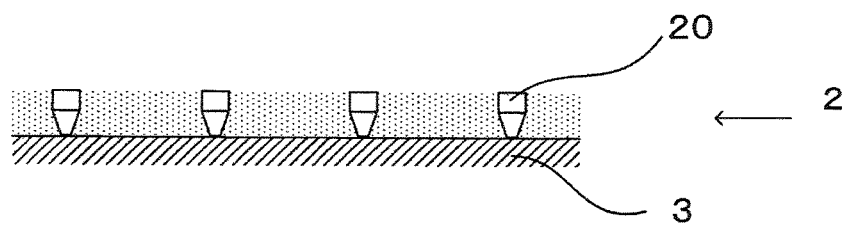
FIG. 4 is a side view of the molding process of the basic construction (1), where (a) shows the stage of molding portions of the struts, (b) shows the stage in which all of the struts and part of the object to be molded have been molded, and (c) shows the stage where the entire molding process has been completed. The dotted region indicates the remaining powder.

As shown in FIGS. 4(a), (b) and (c), the basic construction (1) is designed so that struts 20, and the object 1 to be molded, are sintered and molded in order from the lower side by sintering of a metal powder layer that has been flattened by sliding of a squeegee, and at the stage where molding has been completed, the struts 20 are removed from the object 1 to be molded and the base plate 3 of the molding chamber by striking with a hammer or cutting with a rotary blade.

Figure 5A:
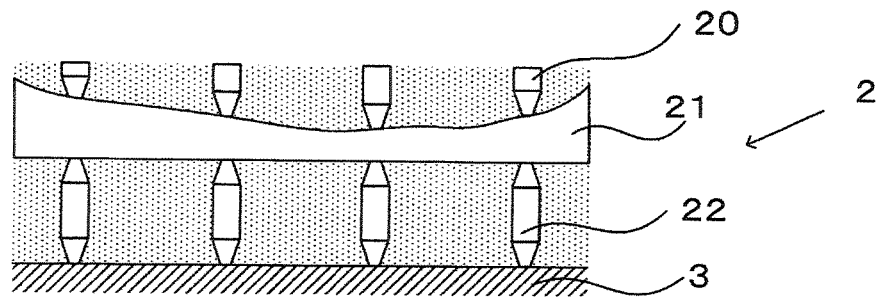
FIG. 5 is a side view showing the molding process for an embodiment according to the basic construction (2) in which the lower side of the object to be molded and the upper side of the middle partition plate are formed in a parallel state so as to be equidistant in the vertical direction, where (a) shows the stage in which molding of parts of the upper struts and all of the middle partition plate and the lower supporting members has been completed, (b) shows the stage in which molding of all of the upper struts, middle partition plate and lower supporting members and part of the object to be molded has been completed, and (c) shows the stage where all of the molding has been completed. The dotted region indicates the remaining powder.
Figure 6A:
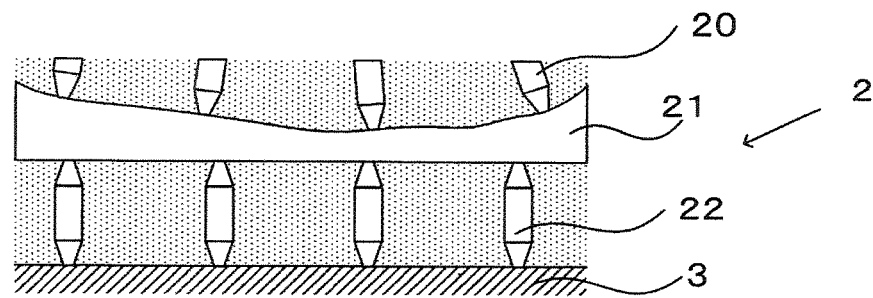
FIG. 6 is a side view showing the molding process for an embodiment according to the basic construction (2) in which the lower side of the object to be molded and the upper side of the middle partition plate are formed in a parallel state so as to be equidistant in the normal direction to the lower side, where (a) shows the stage in which molding of parts of the upper struts and all of the middle partition plate and the lower supporting members has been completed, (b) shows the stage in which molding of all of the upper struts, middle partition plate and lower supporting members and part of the object to be molded has been completed, and (c) shows the stage where all of the molding has been completed. The dotted region indicates the remaining powder.

In the basic construction (2) as well, as shown in FIGS. 5(a), (b) and (c) and FIGS. 6(a), (b) and (c), the lower supporting members 22, the middle partition plate 21, the upper struts 20 and the object 1 to be molded are sintered and molded in order from the lower side by sintering of a metal powder layer that has been flattened by sliding of a squeegee, and at the stage where molding has been completed, the lower supporting members 22, the middle partition plate 21 and the upper struts 20 are all removed from the object 1 to be molded and the base plate 3 of the molding chamber by striking with a hammer or cutting with a rotary blade.

The effect of employing truncated circular conic shapes or partial truncated circular conic shapes as upper parts that are reduced in diameter toward the connection surfaces, for the struts 20 of the basic construction (1) and the upper struts 20 of the basic construction (2), has already been explained above.

Figure 4B:
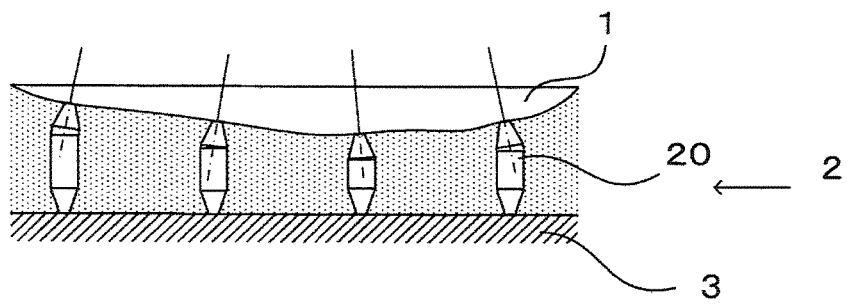
Figure 4C:
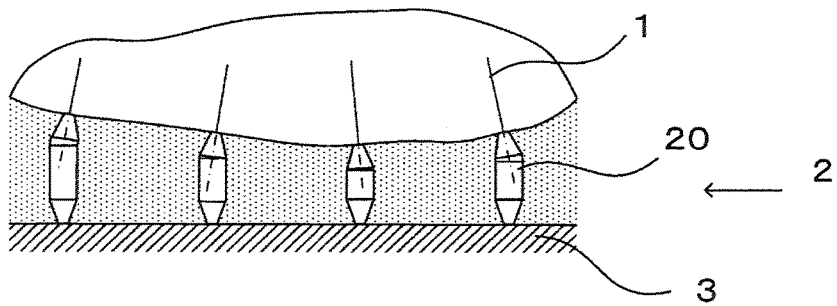
Figure 5B:
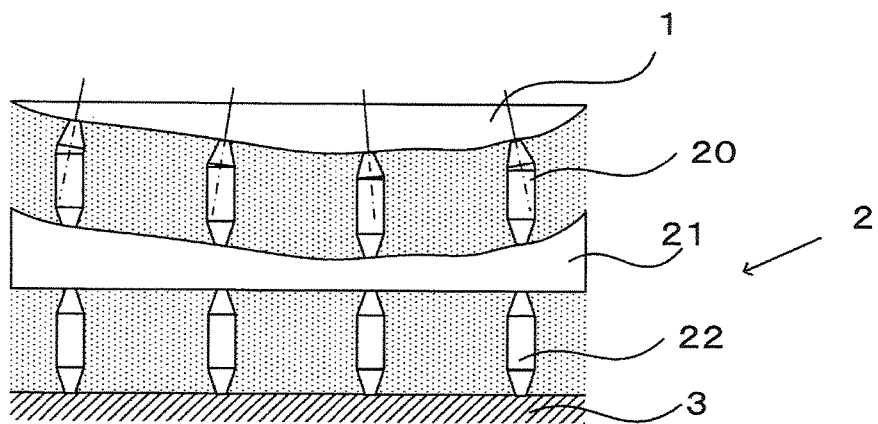
Figure 6B:
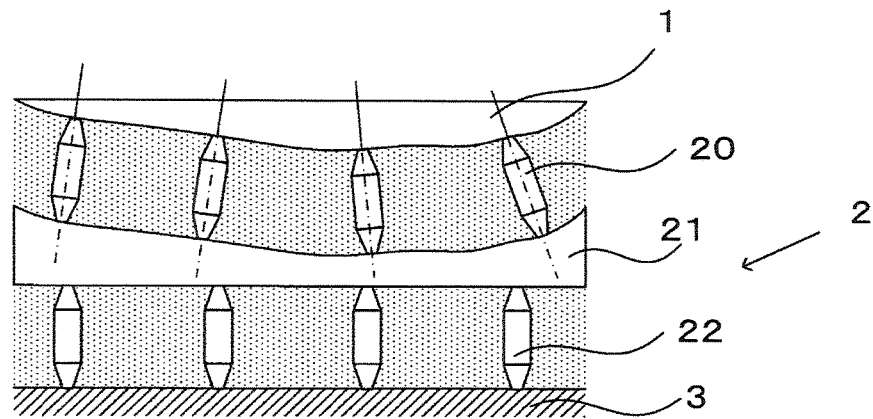

For the struts 20 and upper struts 20, an embodiment may be employed such as shown in FIGS. 4(b) and (c), FIGS. 5(b) and (c) and FIGS. 6(b) and (c) wherein, not only when the connection surfaces with the object 1 to be molded are connection surfaces in the horizontal direction but also when they are in a direction slanted with respect to the horizontal direction, the normal directions at the center coordinate positions of the connection surfaces (indicated in the each drawings by solid lines extending upward from the lower side of the object 1 to be molded and the directions of the central axis lines of the truncated circular conic shapes or partial truncated circular conic shapes (indicated in the each drawings by straight dash-dot lines extending downward from the lower side of the object 1 to be molded are the same directions.

With this type of embodiment, reducing the areas of the connection surfaces allows more efficient removal of the struts 20 or upper struts 20 from the lower side of the object 1 to be molded, compared to when they are not the same directions.

The struts 20 of the basic construction (1) and the upper struts 20 of the basic construction (2) do not need to have truncated circular conic shapes or partial truncated circular conic shapes over their entire regions, and as shown in FIGS. 4(b) and (c), FIGS. 5(b) and (c) and FIGS. 6(b) and (c), circular columns may be used as circular columnar regions at the middle sections in the vertical direction.

Furthermore, as shown in aforementioned each drawings, a construction may be employed in which the lower parts have truncated circular conic shapes with reduced diameters toward the lower side, similar to the upper parts, and are orthogonal to the base plate 3 (in the case of the basic construction (1) shown in FIGS. 4(b) and (c)) or a construction may be employed in which truncated circular conic shapes or partial truncated circular conic shapes that have reduced diameters toward the lower side (in the case of the basic construction (2) shown in FIGS. 5(b) and (c) and FIGS. 6(b) and (c)) are formed in the vertical direction and intersect with the middle partition plate 21.

In an embodiment employing such the shapes, the weight of the object 1 to be molded can be supported with sufficient strength by the cylindrical shapes of the middle sections.

Moreover, with this embodiment, since the areas of the connected sections on the lower sides are smaller compared to other shapes, it is possible to efficiently remove the struts 20 from the base plate 3 (in the case of the basic construction (1)) and to remove the upper struts 20 from the middle partition plate 21 (in the case of the basic construction (2)).

Incidentally, a design is also naturally possible wherein the construction employed for the lower parts of the upper struts of the basic construction (2) is one in which they are not in the vertical direction as in the embodiments shown in FIGS. 5(b) and (c) and FIGS. 6(b) and (c), but similar to the upper parts, the normal directions at the center coordinates of the connection surfaces of the middle partition plate 21 coincide with the directions of the central axis lines of the truncated circular conic shapes or partial truncated circular conic shapes forming the lower parts of the upper struts, so as to reduce the contact areas and contribute to more convenient cutting.

Since the contact surfaces of the struts 20 of the basic construction (1) and the upper struts 20 of the basic construction (2) with the lower side of the object 1 to be molded have prescribed areas, when metal powder is used as the powder, heat generated through the contact surfaces by sintering can be dissipated through the struts 20 and upper struts 20.

However, the powder for the basic constructions (1) and (2) is not limited to metal powder.

In the case of the basic construction (1), it is unnecessary to provide a middle partition plate 21, and as shown in FIGS. 4(a), (b) and (c), a simple construction may be achieved by a design in which the struts 20 are oriented orthogonal to the base plate 3.

However, the lower side of the object 1 to be molded is not a flat surface, and in most cases will be in a corrugated state.

In such cases, for the basic construction (1), it is necessary to vary the vertical directional widths of the struts 20, but in order to obtain an efficient design, when an embodiment is employed with the shapes shown in FIGS. 4(a), (b) and (c), for truncated circular conic shapes or partial truncated circular conic shapes on the upper sides and the truncated circular conic shapes on the lower sides, the design may be the same for all of the struts 20, and in cylindrical regions at the middle sections, the lengthwise dimension in the vertical direction may be varied properly, so an efficient design may be achieved.

In the basic construction (2), the manner of providing the middle partition plate 21 and lower supporting members 22 may appear cumbersome.

However, as shown in FIGS. 5(a), (b) and (c), by making the lower side of the middle partition plate 21 a flat surface that is parallel to the base plate 3, and/or forming the upper side so as to be equidistant and parallel to the lower side of the object 1 to be molded in the perpendicular direction (vertical direction), it is possible to achieve a simple design so that the upper struts 20 and/or lower supporting members 22 have the same dimensions in the vertical direction.

Moreover, as shown in FIGS. 6(a), (b) and (c), by making the lower side of the middle partition plate 21 a flat surface that is parallel to the base plate 3, and/or forming the upper side so as to be equidistant and parallel to the lower side of the object 1 to be molded in the normal directions to the lower side, it is possible to achieve a simple design so that the upper struts 20 and lower supporting members 22 all have the same shapes.

Figure 5C:
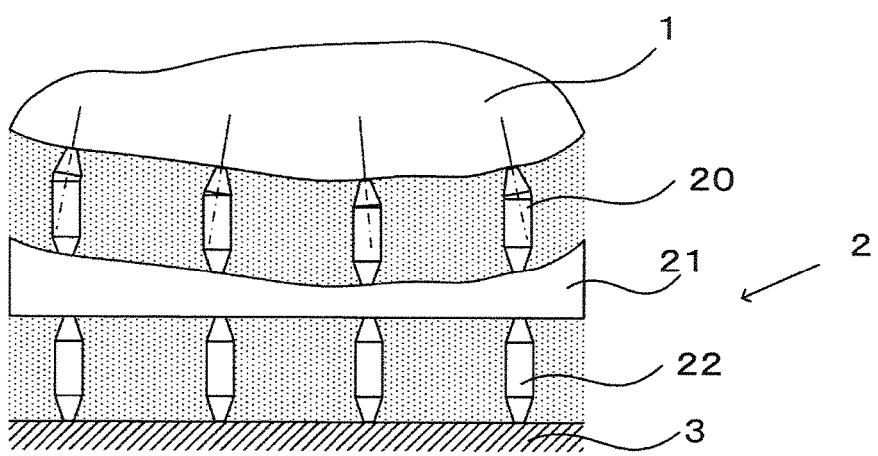
Figure 6C:
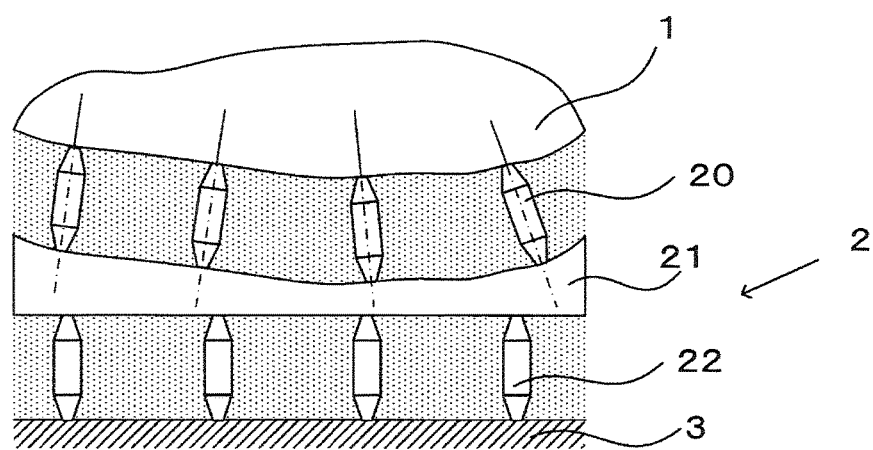

With the simple designs shown in FIG. 5 and FIG. 6, it is possible to achieve efficient operation by a uniform degree of striking with a hammer during removal from the object 1 to be molded and the middle partition plate 21.

As shown in FIGS. 5(a), (b) and (c) and FIGS. 6(a), (b) and (c), a horizontal flat surface is usually employed for the lower side of the middle partition plate 21, but if an embodiment is employed for the lower supporting members 22 situated between the lower side and the base plate 3 wherein the lower supporting members 22 consist of struts 20 in which truncated circular conic shapes with the upper parts reduced in diameter toward the top are used for the upper parts, truncated circular conic shapes with the lower parts reduced in diameter toward the bottom are used for the lower parts, and cylindrical shapes are used for the middle sections, the struts 20 being orthogonal to the lower side of the middle partition plate 21 and the base plate 3, then it will be possible to efficiently remove the lower supporting members 22 from the middle partition plate 21 and base plate 3.

In the basic construction (2), if the lower side of the middle partition plate 21 is a horizontal flat surface as in the embodiment described above, then a simple design can be achieved by the feature of the lower supporting members 22 in which the upper parts are orthogonal to the lower side of the middle partition plate 21 and the lower parts are orthogonal to the base plate 3, as shown in FIGS. 5(a), (b) and (c) and FIGS. 6(a), (b) and (c).

Particularly in the case of an embodiment wherein truncated circular conic shapes that are reduced in diameter toward the top are employed for the upper parts of the lower supporting members 22, cylindrical shapes are employed for the middle sections and truncated circular conic shapes that are reduced in diameter toward the bottom are employed for the lower parts, for the reasons explained in (a) and (b) under Advantageous Effects of Invention in regard to the lower supporting members 22, the lower supporting members 22 can be efficiently removed from the lower side of the middle partition plate 21 and the base plate 3.

Figure 7A:
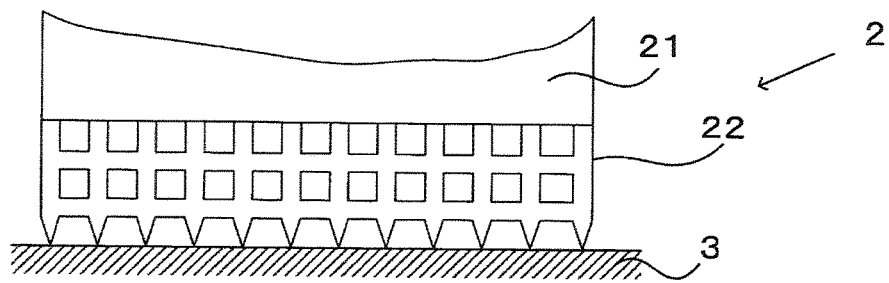
FIG. 7 is a side view of an embodiment in which a lattice is employed for the lower supporting members of the basic construction (2), where (a) shows the case of a lattice orthogonal to the base plate, and (b) shows the case of a lattice oblique to the base plate.
Figure 7B:
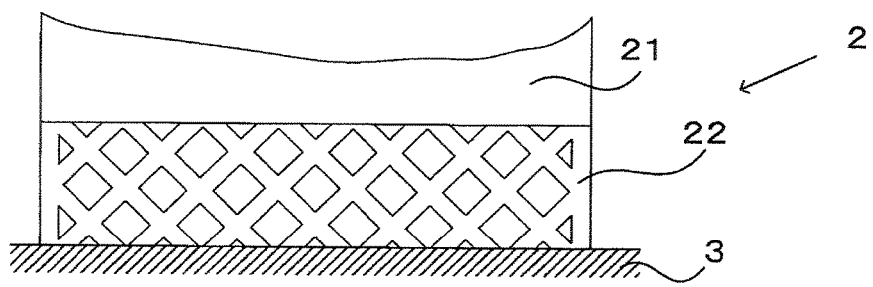

The lower supporting members 22 of the basic construction (2) may also employ a lattice form such as shown in FIGS. 7(a) and (b), instead of only struts 20 that are orthogonal to the base plate 3 as shown in FIGS. 5(a), (b) and (c) and FIGS. 6(a), (b) and (c), and moreover the lattice employed may be a lattice that is oblique to the base plate 3, as shown in FIG. 7(b), instead of the lattice orthogonal to the base plate 3 as shown in FIG. 7(a).

With such the lattice designs, it will be possible to obtain a stably supported state for the middle partition plate 21.

Furthermore, even with a design in which the contact area between the lower supporting members 22 and the base plate 3 is, for example, extremely small as shown in FIG. 7(a), the stably supported state is maintained while allowing removal at once from the base plate 3 when the lower supporting members 22 are powerfully struck with a hammer.

The invention will now be explained with reference to the examples.

Example 1

Example 1 is characterized in the basic construction (1) where the exposure dose per unit area with the laser light or the electron beam during molding of the struts 20 is set to be lower than the exposure dose per unit area on the outer surface of the object 1 to be molded and its vicinity, and the molding process with selection of the exposure dose is shown in the flowchart in FIG. 1.

By this feature, it is possible to easily and efficiently remove the struts 20 from the object 1 to be molded and the base plate 3.

In Example 1, a design may be selected so that the exposure dose per unit area of the horizontal connection surfaces, particularly within the connection surfaces between the object 1 to be molded and the struts 20, is set to be an amount sufficient to withstand the shear force caused by sliding of the squeegee, but to not exceed it.

With this design, the struts 20 maintain their state of connection with the object 1 to be molded and their state of support of the object 1 to be molded during movement of the squeegee, while upon completion of molding, the struts 20 can be easily removed from the object 1 to be molded due to the weakly sintered state of the level described above.

In the case of Example 1 which also includes this design, as shown in FIG. 3, it is possible to employ a method in which the shapes of the object 1 to be molded and each of the struts 20 are set using a CAD system 41, and the exposure dose per unit area in each of the molding regions is controlled using a CAD system 41 or CAM system 42.

Example 2

Example 2 is characterized in the basic construction (2) where the exposure dose per unit area with the laser light or the electron beam during molding of the upper struts 20, middle partition plate 21 and lower supporting members 22 is set to be lower than the exposure dose per unit area on the outer surface of the object 1 to be molded and its vicinity, and the molding process with selection of the exposure dose is shown in the flowchart of FIG. 2.

In Example 2 as well, a design may be selected so that the exposure dose per unit area of the horizontal connection surface, particularly within the connection surface between the object 1 to be molded and the upper struts 20, is set to be an amount sufficient to withstand the shear force caused by sliding of the squeegee, but to not exceed it.

With this design, the upper struts 20 maintain their state of connection with the object 1 to be molded and their state of support of the object 1 to be molded during movement of the squeegee, while upon completion of molding, the upper struts 20 can be easily removed from the object 1 to be molded due to the weakly sintered state on the level as is described above.

In the case of Example 2 which also includes this design, as shown in FIG. 3, it is possible to employ a method in which the shapes of the object 1 to be molded and each of the upper struts 20, the middle partition plate 21 and each of the lower supporting members 22 are set using a CAD system 41, and the exposure dose per unit area in each of the molding regions is controlled using a CAD system 41 or CAM system 42.

INDUSTRIAL APPLICABILITY

The present invention which is based on the basic constructions (1) and (2) enables stable molding of an object to be molded and smooth movement of the squeegee, as well as efficient removal of the support structure after molding has been completed, and it therefore has an extremely wide range of industry utility.

REFERENCE SIGNS LIST

1: Object to be molded
2: Support structure
20: Struts and upper struts
21: Middle partition plate
22: Lower supporting members
3: Base plate
4: CAD/CAM system
41: CAD System
42: CAM system
5: Controller
6: Irradiation device

What is claimed is:

1. A three-dimensional molding method comprising the steps of:
   repeatedly forming the following steps a number of times:
      forming a flat surface by sliding of a squeegee against a powder layer, and
      sintering the powder layer with a laser light or an electron beam;
   then cutting a periphery of the sintered layers, in order to mold an object to be molded, a plurality of struts that support the object from a lower side and which are intended to be removed after molding, a middle partition plate that supports the struts from below and is intended to be removed after molding, and lower supporting members that support the partition plate from below and are intended to be removed after molding,
   wherein the steps of forming and sintering include the step of forming upper parts of the struts to employ one of:
      truncated circular conic shapes, or
      partial truncated circular conic shapes
   that are reduced in diameter toward a top thereof.

2. The three-dimensional molding method according to claim 1, wherein the step of forming upper parts of the struts include the step of forming said upper parts of the struts such that, at connection surfaces between the object to be molded and the upper struts, directions of normals at center coordinates of the connection surfaces coincide with directions of central axes of the one of truncated circular conic shapes or partial truncated circular conic shapes forming the upper parts of the upper struts, whether the connection surfaces are horizontal or slanted with respect to a horizontal direction.

3. The three-dimensional molding method according to claim 1, wherein the steps of forming and sintering include the step of forming an upper side surface of the middle partition plate and a lower side surface of the object to be molded in a parallel state so as to be equidistant in the vertical direction.

4. The three-dimensional molding method according to claim 1, wherein the steps of forming and sintering include the step of forming an upper side surface of the middle partition plate and a lower side surface of the object to be molded in a parallel state so as to be equidistant in a normal direction to the lower side surface.

5. The three-dimensional molding method according to claim 1, wherein the steps of forming and sintering include the step of forming middle sections of the upper struts to employ cylindrical shapes and lower parts of the upper struts to employ one of truncated circular conic shapes or partial truncated circular conic shapes that are reduced in diameter toward a bottom thereof, and forming central axis lines of the one of the truncated circular conic shapes or partial truncated circular conic shapes in the vertical direction which intersect with the middle partition plate.

6. The three-dimensional molding method according to claim 1, wherein the steps of forming and sintering include the step of forming a lower side of the middle partition plate in a horizontal direction.

7. The three-dimensional molding method according to claim 6, wherein the steps of forming and sintering include the step of forming the lower supporting members as struts with upper parts thereof orthogonal with a lower side of the middle partition plate and lower parts thereof orthogonal to a base plate.

8. The three-dimensional molding method according to claim 7, wherein the steps of forming and sintering include the step of forming the lower supporting members with truncated circular conic shapes with reduced diameters toward a top thereof as upper parts thereof, cylindrical shapes as middle sections and truncated circular conic shapes with reduced diameters toward a bottom thereof as lower parts thereof.

9. The three-dimensional molding method according to claim 1, wherein steps of forming and sintering include the step of forming each lower supporting member as a lattice structure that intersects in three-dimensional directions.

10. The three-dimensional molding method according to claim 1, wherein the step of sintering includes the step of setting an exposure dose per unit area with the laser light or the electron beam for molding of the upper struts, the middle partition plate and the lower supporting members to be lower than an exposure dose per unit area on an outer surface of the object to be molded and a vicinity thereof.

11. The three-dimensional molding method according to claim 10, further comprising the steps of:
setting shapes of the object to be molded and each of the struts, the middle partition plate and each of the lower supporting members using a CAD system, and
controlling the exposure dose per unit area in each of the molding regions using one of:
a CAD system and
a CAM system.

* * * * *